April 19, 1927.

E. C. NEUENDORF

HEADLIGHT SHIELD

Filed April 9, 1924

1,625,621

INVENTOR.
Edward C. Neuendorf
BY
ATTORNEY.

Patented Apr. 19, 1927.

1,625,621

UNITED STATES PATENT OFFICE.

EDWARD C. NEUENDORF, OF WYANDOTTE, MICHIGAN.

HEADLIGHT SHIELD.

Application filed April 9, 1924. Serial No. 705,156.

My invention relates to a new and useful improvement in shield for headlights, particularly those headlights adapted for use with vehicles; such as, automobiles, and the like. An object of the invention is the provision of means, attachable to a vehicle headlight whereby the rays from the headlight are deflected angularly from their natural path of reflection toward the right of the vehicle, so as to shut off the rays and prevent their travelling a path directly in front of the vehicle, so as to render less hazardous the driving of an approaching vehicle.

Another object of the invention is the provision of a headlight shield adapted for mounting on a vehicle headlight, whereby the shield may be quickly and easily moved, to permit the rays from the headlight to travel in a path directly in front of the vehicle, or be swung to deflect the rays of the headlight so as to direct the same toward one side of the vehicle.

Another object of the invention is the provision of a shield of this class adapted for mounting on a vehicle headlight, so arranged as to, in one position, deflect the rays of the headlight toward the right of the vehicle immediately in front of it so as to illuminate the side of the road, to which the driver is forced to direct his vehicle when passing an approaching vehicle, and thus minimize the chances of driving too far to the right of the road in permitting an approaching vehicle to pass.

Another object of the invention is the provision of a vehicle headlight deflector adapted for mounting on a headlight and so arranged as to prevent the passage of rays of light in a path parallel with the direction of travel of the vehicle, while at the same time, permitting a maximum amount of rays of light to emanate from the headlight and travel in a path diagonally of the path of travel of the vehicle.

Other objects will appear hereinafter.

The invention consists in the combinations and arrangements of parts hereinafter described and claimed.

Figure 1:
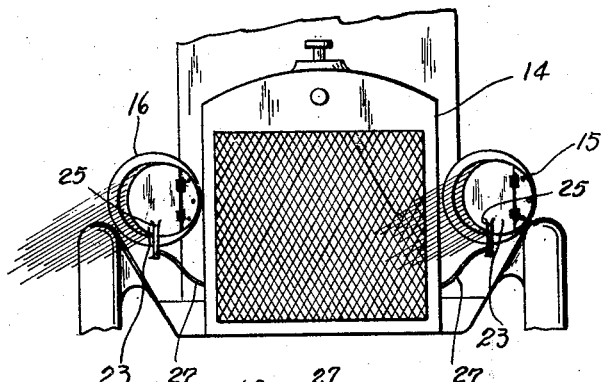
Figure 2:
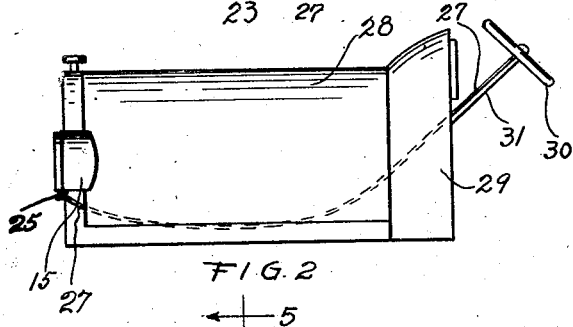
Figure 4:
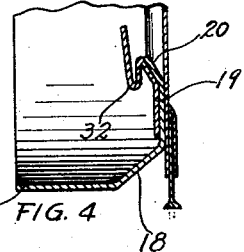
Figure 3:
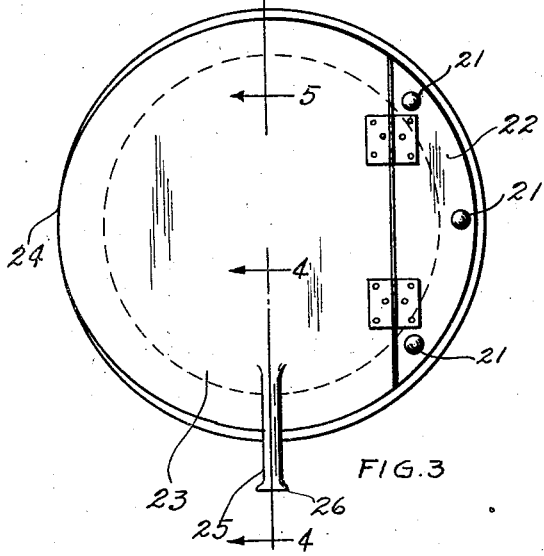
Figure 6:
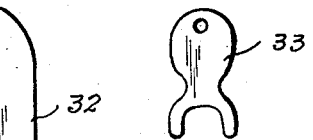
Figure 7:
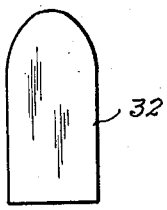
Figure 5:
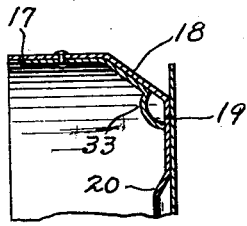

The invention will be best understood from a reference to the accompanying drawings which form a part of this invention, and in which, Fig. 1 is a front elevational view of the invention showing it attached to a vehicle, Fig. 2 is a side elevational view of the forward part of a vehicle showing the operating rod, Fig. 3 is a front elevational view of the invention, Fig. 4 is a sectional view taken substantially on line 4—4 of Fig. 3, Fig. 5 is a sectional view taken substantially on line 5—5 of Fig. 3, Fig. 6 is a plan view of an attaching tongue used with the rim of the headlight, Fig. 7 is a plan view of another attaching tongue used with the rim of the headlight.

The invention, in its preferred form, is adapted for use with a vehicle 14, having headlights 15 and 16 at opposite sides thereof. These headlights are each provided with a rim having a flange 17 provided with an angularly extending portion 18, which is, in turn, angularly extended to provide the vertically projecting portion 19, said member 19 terminating in an inwardly bent flange 20. Attached to the portion 19, by suitable rivets 21, is a segment 22 which is made from some suitable sheet material, said segment being adapted to lie along its curved surface in alinement with the point of bend between the portions 18 and 19. Hingedly connected by suitable hinges to the segment 22 is a shield 23 adapted along the major portion of its periphery to lie in alinement with the line of bend between the portions 19 and 18, and adjacent its free end bulged outwardly as at 24 to project slightly beyond the outer side of the rim attached to the vehicle headlight. The inner surface of the shield 23 is burnished to provide a suitable reflecting surface so that the rays of light striking thereon are reflected in their fullness. Welded, or otherwise suitably secured, to the shield 23 adjacent one side thereof, is an outwardly projecting stud 25 having a head 26 formed thereon adapted for attachment to a wire 27 which extends under the hood 28 and beyond the cowl 29 of the vehicle and is attached, in an accessible point to the driver of the vehicle, preferably adjacent the steering wheel 30 or the steering post 31. This wire 27 may be enclosed, if desired, in a suitable tubing. It is apparent that the spirit of the invention may be retained with various means of operating the reflecting shields, the wire being shown as the preferred form.

In operation, when it is desired to permit the rays of light to emanate in a direct forward path of the vehicle headlights, the wire is so manipulated as to swing the reflecting member 23 backwardly so as not to obstruct any of the rays of the headlight.

When an approaching vehicle draws near, the shields may be angularly swung to the position shown in Fig. 1, so as to shut off the direct rays of lights and direct the same diagonally of the path of travel toward the right of the vehicle so that the edge of the road to which the driver must closely approach to permit a passing vehicle clearance, or the curb of the street, as the case may be, is well illuminated. By forming the bulge 24 on the shields, the same may be opened quite widely to deflect the rays of light to the right of the path of travel while, at the same time, shutting off rays of light from travelling directly in the path of travel of the vehicle. This permits a larger amount of light to be deflected toward the side of the road, or street, to be illuminated and adds to the efficiency of the device shown. Furthermore, by reducing the diameter of the major portion of the shield, the amount of material used is lessened, resulting in economy of structure. Mounted on the inner portion of the rim are suitable securing means 32 and 33 which are designed to retain the rim in position as well as retain the lens positioned within the rim. These elements, however, form no feature of this invention and are, therefore, not described in detail. The stud 25 may be formed from an ordinary nail, if desired, or a tongue may be punched from the material, the particular choice of mounting this attaching means being left to the discretion of the one constructing the device.

A device constructed in the manner shown is one that is simple, cheaply manufactured, highly efficient, and durable and these features, together with the operation of the same are believed to afford a device which may be easily and quickly mounted on a vehicle headlight. If desired, the portion 22 may be formed integral with the main body of the rim which is mounted on the headlight, this matter being left optional with the one constructing it.

While I have illustrated and described the preferred form of structure, I do not wish to limit myself to the precise form of structure shown, but desire to avail myself of such variations and modifications as come within the scope of the appended claims.

Having thus described my invention, what I claim as new and desire to secure by Letters Patent is:

In combination with a vehicle headlight, adapted for use with a vehicle, and provided with a rim mounted thereon; a segment mounted on the face of said rim and adapted to project inwardly slightly of the opening of the same, the straight edge of said segment extending vertically; a shield hingedly mounted on the straight edge of said segment, the central portion of the free side of said shield being bulged outwardly to project slightly beyond the edge of said rim, said bulge being gradual throughout the major portion of said shield for distributing the major weight thereof uniformly over its area; a stud projecting downwardly from one side of said shield substantially diametrically thereof; and means cooperatively connected to said stud for swinging said shield on its point of attachment as a pivot for deflecting, at will, in a direction away from said segment, the light rays emanating from said headlight said shield when moved to closed position forming with said segment a slightly bulged circular disc.

In testimony whereof I have signed the foregoing specification.

EDWARD C. NEUENDORF.